United States Patent [19]
Okada

[11] Patent Number: 5,493,156
[45] Date of Patent: Feb. 20, 1996

[54] EQUIPMENT USING A MICRO-ACTUATOR

[75] Inventor: Hiroyuki Okada, Tokyo, Japan

[73] Assignee: NEC Corporation, Tokyo, Japan

[21] Appl. No.: 940,516

[22] Filed: Sep. 4, 1992

[30] Foreign Application Priority Data

Sep. 5, 1991 [JP] Japan .................................. 3-225752

[51] Int. Cl.$^6$ ...................................................... H02K 7/00
[52] U.S. Cl. ...................... 310/40 MM; 310/83; 310/309
[58] Field of Search ...................................... 310/309, 405, 310/310, 254, 308, 261, 40 MM, 83, 254, 261; 322/2 A; 156/655

[56] References Cited

U.S. PATENT DOCUMENTS

| | | | |
|---|---|---|---|
| 4,997,521 | 3/1991 | Howe et al. | 156/655 |
| 5,013,954 | 5/1991 | Shibaike et al. | 310/309 |
| 5,252,881 | 8/1993 | Muller et al. | 310/309 |
| 5,262,695 | 11/1993 | Kuwano et al. | 310/309 |

FOREIGN PATENT DOCUMENTS 3230780  10/1991  Japan .
4251579  9/1992  Japan .................................. 310/309

OTHER PUBLICATIONS

Fan, Long–Shen, et al., "IC–Processed Electrostatic Micromotors" *IEEE*, 1988, pp. 666–669.

Suzuki, Kenichiro, et al. "Single Crystal Silicon Micro–Actuators" *IEEE*, 1990, pp. 625–628.

Laterally Driven Polysilicon Resonant Microstructures; Tang et al.; Univ. of California, Berkeley, CA; (no month) 1989, pp. 53–59.

The Liga–Technique—a Novel Concept of Microstructures and the Combination with Si–Technologies by Injection Molding; Menz et al; (no month) 1991; pp. 69–73.

*Primary Examiner*—R. Skudy

[57] ABSTRACT

A micro electro mechanical device has at least two layers of substrates. In a first layer, a micro-actuator is formed, and in a second layer facing to the first layer, a passive movable unit is formed. Rotation of the rotor unit of the microactuator is coupled to the movable unit on the second layer by suitable engaging means.

3 Claims, 4 Drawing Sheets

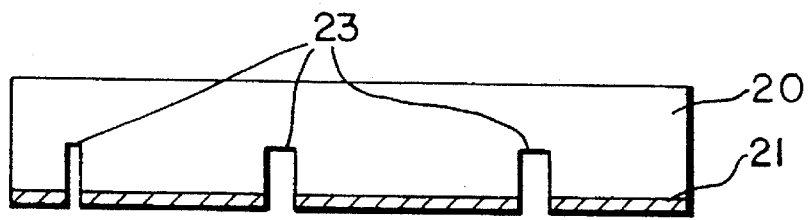
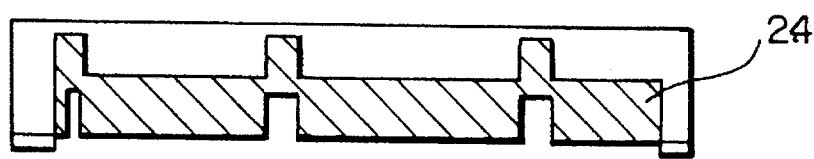
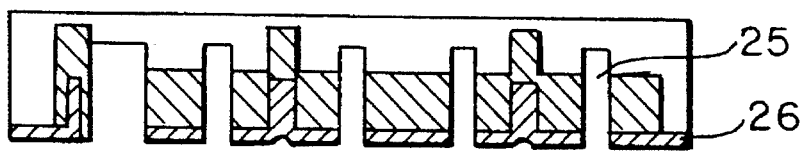
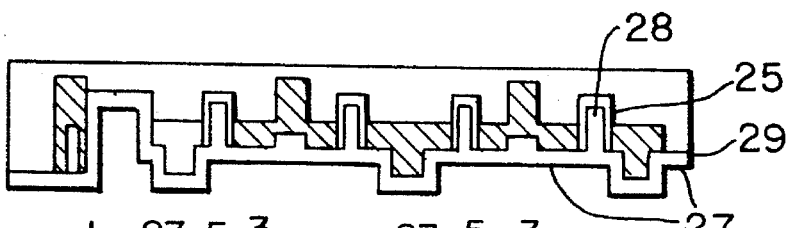
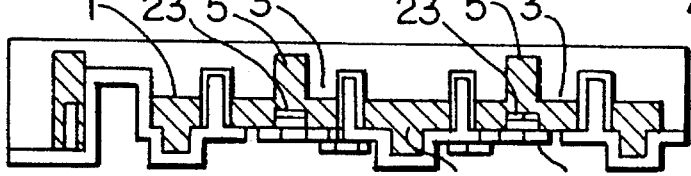
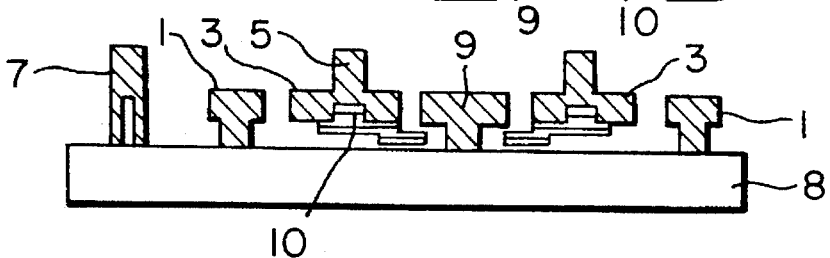

EQUIPMENT USING A MICRO-ACTUATOR

BACKGROUND OF THE INVENTION

This invention relates to an equipment using a micro-actuator applicable in medical instruments and optical instruments.

In order to provide an equipment which can be inserted in a small space where conventional equipments are not accessible and to provide an equipment which can control a very fine movement with a required precision, miniaturization of machine parts has become necessary.

Fine processing engineering using technics of fabricating silicon integrated circuits, has supplied technics for fabricating micro electro mechanical systems. Thus, a micro rotor of about 100 μm diameter is rotated or an object of a similar dimension is linearly displaced. The present invention relates to such micro-actuators and manufacturing process thereof.

Prior arts of the above-mentioned micro-actuators are disclosed on "Laterally Driven Resonant Microstructures" in 1989 of HEMS (Micro Electro Mechanical Systems) (pp53~59), on "IC-Processed Electrostatic Micro-motors" by Long-Sheng Fan et al in 1988 IEEE (pp666~669), on "Single Crystal Silicon Micro-Actuators" by K. Suzuki in 1990 IEEE (pp625~628), and in a Japanese Patent Application (laid-open Publication No. Hei3-230780) filed by the same applicant of this invention on Feb. 2, 1990, and published on Oct. 12, 1991.

In these conventional devices, a stator unit is fixed on a substrate, and a movable unit is floatingly supported by the substrate. An electro-static force exerting between the stator unit and the movable unit, drives the movable unit. Since the mass of the movable unit is very small, the movable unit has a very high resonant frequency with a sharp resonance character.

But, in all rotary types of micro-actuators of the prior arts, it is not easy to transmit the rotation of the movable part to an external object. This is because of the fact that the movable unit (or the rotor unit) is surrounded by the stator unit in a same plane.

Linear displacement type of movable unit can be easily connected to an external device since there is no obstruction in the direction of the linear motion. But, rotary motions are primarily required to the microactuators, the difficulty of transmitting the rotary motion to an external object, is a restriction of prior art devices.

BRIEF DESCRIPTION OF THE INVENTION

Therefore, a primary object of the present invention is to provide an equipment using a rotary type micro-actuator in which rotation of the rotor unit can be easily coupled to external devices.

First and second layers of substrates are adhered to form a micro-actuator.

The micro-actuator is formed on the first layer, and a passive movable unit is formed on the second layer.

Since there are no obstacles around the passive movable unit on the second layer, the rotary motion of the micro-actuator can be easily coupled to external devices via the passive movable unit.

Another object of this invention is to provide suitable means for engaging the rotary motion of the microactuator to the passive movable unit.

In a manufacturing process of an equipment, using a micro-actuator according to this invention, the two layers are separately and independently processed, and then the finished two layers are adhered together. Thus, still another object of this invention is to provide suitable means for aligning the two layers.

BRIEF DESCRIPTION OF THE DRAWINGS

Further objects, features, and advantages of this invention will become apparent from a consideration of the following description, the appended claims, and the accompanying drawings in which the same numerals indicate the same parts.

FIGS. 2(a) to 2(f) show cross sectional views of the first layer of the embodiment shown in FIGS. 1(a) and 1(b), illustrating steps of manufacturing process.

DETAILED DESCRIPTION OF THE PREFERRED EMBODIMENTS

Figure 1A:
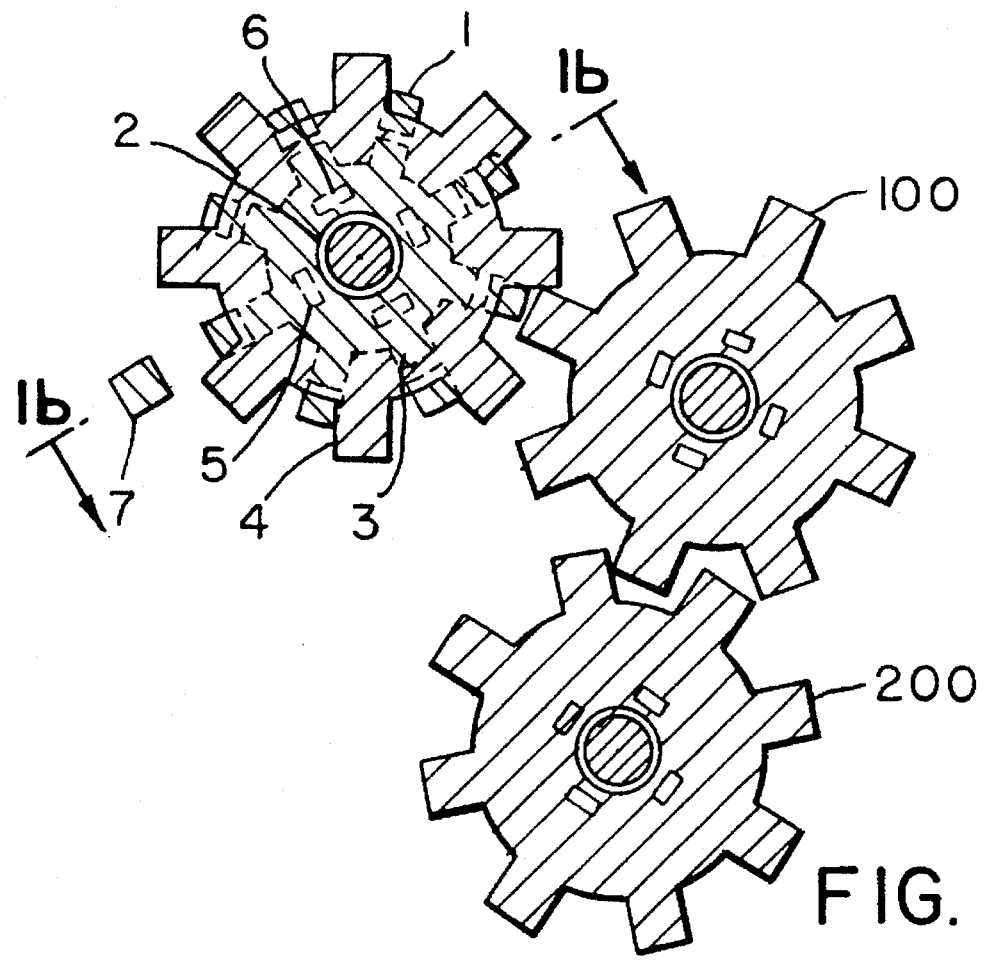
FIGS. 1(a) and 1(b) show a schematical plan view and a cross sectional view respectively of an embodiment of this invention.
Figure 1B:
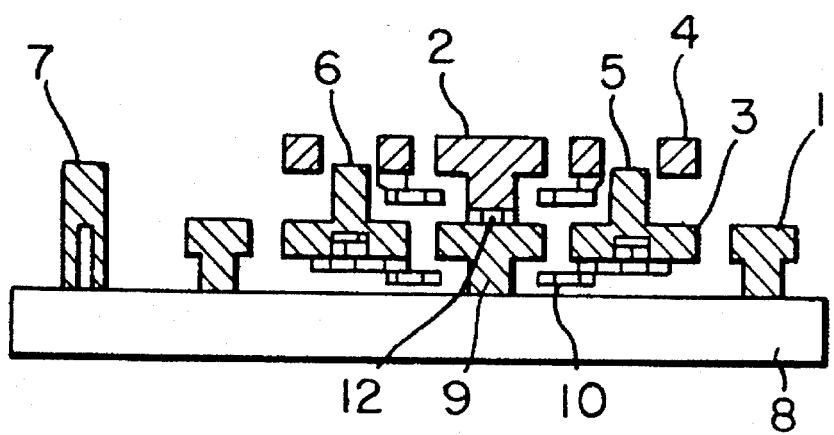

Referring now to FIGS. 1(a) and 1(b), it will be seen that a micro-actuator according to the preferred embodiment of the present invention includes a stator unit 1, a fixed axis 2, a rotor unit 3, a movable part 4, projections 5, openings 6 in the movable part for receiving projections 5, respectively, a projection 7 for alignment, a fixed axis 9 and a stopper 10 which are provided on a glass substrate 8. As will be described in detail below, the stator unit 1, rotor unit 3, projections 5 and 7, fixed axis 9 and stopper 10 are formed from respective parts of a first layer made of silicon wafer, and the fixed axis 2 and the movable part 4 are formed from respective parts of a second layer made of silicon wafer.

An electric voltage is impressed between the stator unit 1 and the rotor unit 3 through conductors (not shown in the drawing) formed on the first layer to generate an electro-static force attracting the rotor unit 3. This electric voltage is sequentially and cyclically switched between poles of stator unit 1 in a way that the force attracting the rotor unit 3 is maintained in the same rotational direction. In this way, the rotor unit 3 is rotated around the fixed axis 9 on the first layer.

Thus, the stator unit 1, the rotor unit 3, and the fixed axis 9 composed a micro-motor which is a rotary type micro-actuator.

The projections 5 (there are four projections 5 in the embodiment shown in FIG. 1(a) and 1(b) of the rotor unit 3 are engaged to openings 6 provided in the movable part 4 transmit the rotation of the rotor unit 3 to the movable part 4.

In the embodiment shown in FIG. 1(a) and 1(b), the movable part 4 takes a form of a spur gear, and can be easily engaged to an external devices as are shown by gears 100 and 200 in FIG. 1(a).

The micro-actuator thus constructed is made up by one silicon wafer as a first layer and another silicon wafer as a second layer, these first and second layers being fabricated separately and independently according to the present invention, as shown in FIGS. 2(a)–2(f) and 3(a)–3(f) and will be explained below.

FIG. 2(a)–2(f) show steps of manufacturing process of the first layer. In a first step (FIG. 2(a)), a silicon wafer 20 is treated by RIE (reactive ion etching) to form trenches 23 with a mask of an oxide film 21 formed on a surface of the wafer 20.

In a second step (FIG. 2(b)), boron is diffused in high density in an area 24 where the micro-actuator is formed. In a third step (FIG. 2(c)), deep trenches 25 are formed with a mask of an oxide film 26, which fills up the trenches 23 formed in the first step (FIG. 2(a)).

In a fourth step (FIG. 2(d)), after shallow trenches 27 are formed, the deep trenches 25 are filled up by poly silicon 28, and all the surface is covered by poly silicon film 29. In a fifth step (FIG. 2(e)), the poly silicon film 29 is removed from areas covering the trenches 23, and an oxide film is deposited and patterned to form the stopper 10 from the trenches 23 to the fixed axis 9.

In a sixth step (FIG. 2(f)), the oxide film on the wafer surface is removed, and the silicon substrate is adhered to a glass substrate 8 by electrostatic adhesion process. After this adhesion process, the wafer is immersed in hydrazine liquid for etching. Because of the edge-stop character of high density boron diffusion, the rotor unit 3, the stator unit 1, the fixed axis 9, the projection 5, 7, and the stopper are formed. The stopper 10 is to prevent the rotor unit 3 from getting out of the fixed axis 9 as shown in FIG 2(f) the stator unit 1 is provided for substrate 8.

The manufacturing process of the second layer is shown in FIGS. 3(a)–3(f), and by comparing FIGS. 3(a)–3(f) with FIGS. 2(a)–2(f), respectively, it will be seen that the manufacturing process of the second layer is very similar to that of the first layer.

A few points which are peculiar to the second layer are described. An alignment hole 11 used for aligning the second layer to the first layer becomes unnecessary after the device is completed. Therefore, boron diffusion is not performed in environs of the hole 11 as shown by a second step of FIG. 3(c).

Figure 3A:
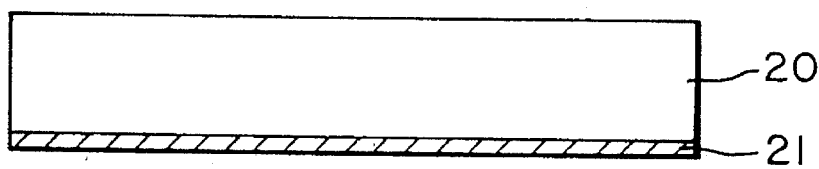
FIGS. 3(a) to 3(f) show cross sectional views of the second layer of the embodiment shown in FIGS. 1(a) and 1(b), illustrating steps of manufacturing process.
Figure 3B:
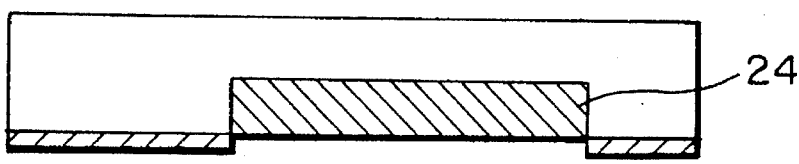
Figure 3C:
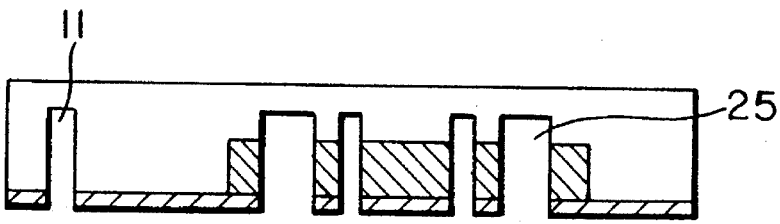
Figure 3D:
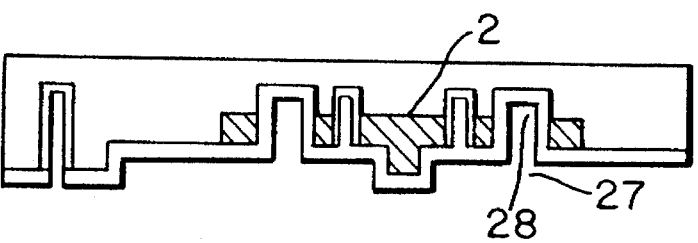
Figure 3E:
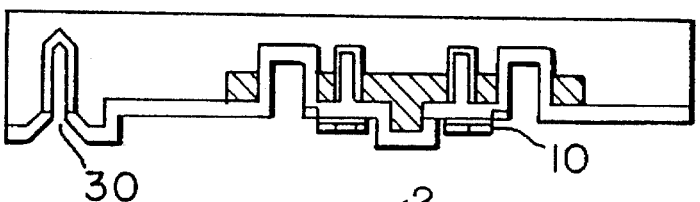

As shown in a fifth step of FIG. 3(e), a taper 30 is provided at the entrance of the hole 11, by utilizing an anisotropic etching character of (100) surface of a silicon crystal. This taper 30 enables a smooth alignment when there remains a small position error between the first and the second layer. At the outset of the alignment process, the projection 7 first touches the taper 30 protecting other machine elements from touching, since the taper 30 is formed in the lowest part of the second layer.

Figure 3F:
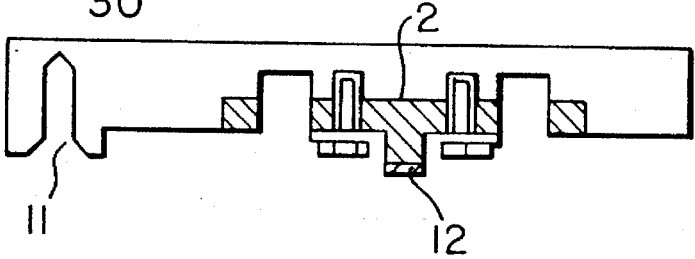

A glass film 12 is coated on the fixed part 2 on the second substrate as shown in a sixth step of FIG. 3(f). This glass film 2 is effective in adhering the second layer to the first layer by an electrostatic adhesion process as described in connection with the sixth step of FIG. 2(f).

Figure 4A:
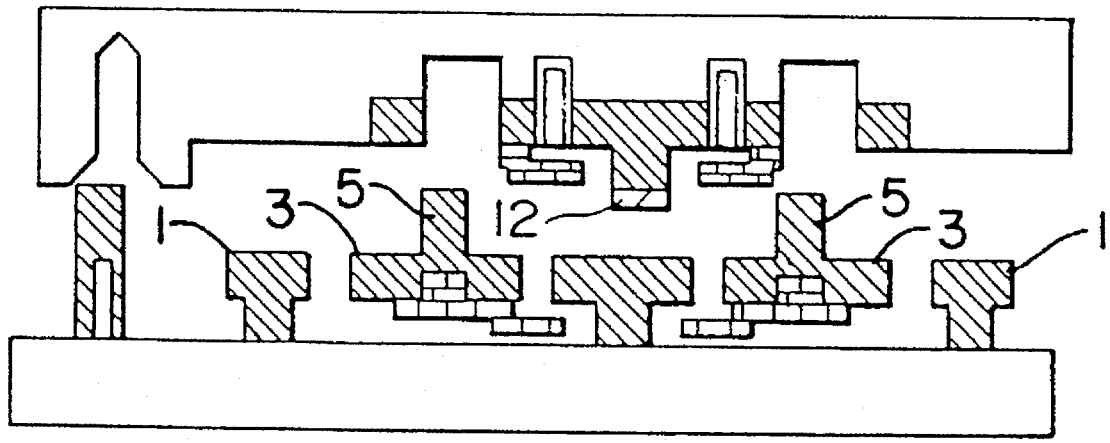
FIGS. 4(a) and 4(b) show cross sectional views in the step of aligning the two layers.
Figure 4B:
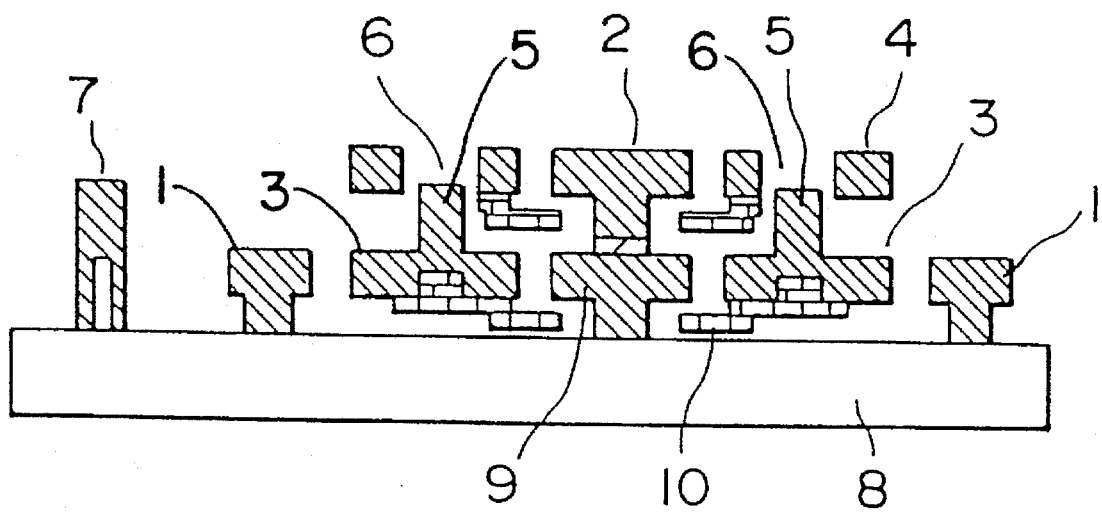

FIGS. 4(a) and 4(b) show the steps of aligning the first layer to the second layer, of adhering the two layers through the glass film 12, and of removing the silicon substrate of the second layer by etching process as described in connection with the sixth step of FIG. 2(f).

So far, this invention has been described for an embodiment having two layers facing to each other. But it is to be understood that the number of layers does not limit this invention. For example, there may be provided a third layer or a fourth layer by the manufacturing method of this invention.

And in the embodiment described, projections 5 on the first layer engages to corresponding openings 6 on the second layer to transmit motion from the first layer to the second layer. It is apparent that any engaging means other than the projections 5 and the openings 6, may be used in this invention.

Again, a projection 7 on the first layer and an alignment hole 11 in the second layer is used for aligning the two layers in the embodiment described. But any other means for alignment may be used in this invention.

Further, an electrostatic force is used to drive the rotor unit 3 in the embodiment. But any kind of motive force may drive the rotor unit of this invention. A hydraulic force as disclosed on the "The LIGA Technique-a Novel Concept for Microstructures and the Combination with Si-Technologies by Injection Molding" by W. Menz et al in 1991 papers, p.p. 63–73, may be used in this invention.

And, it is also apparent that this invention can be used in linear type micro-actuators.

I claim:

1. An equipment using a micro-actuator comprising:
   a substrate;
   a rotor unit provided on said substrate so as to freely rotate, said rotor unit having at least one projection; and
   a movable part having at least one opening, said movable part being provided above said rotor unit, said at least one projection of said rotor unit engaging in said at least one opening of said movable part to transmit rotation of said rotor unit to said movable part.

2. The equipment as claimed in claim 1, further comprising at least one stator unit provided on said substrate to rotate said rotor unit such that rotation of said rotor unit causes said movable part to rotate.

3. The equipment as claimed in claim 2, wherein said movable part transmits rotation thereof to an external gear.

* * * * *